United States Patent [19]

DeVone

[11] 4,045,077
[45] Aug. 30, 1977

[54] CONVERTRA-BIKE TOP

[76] Inventor: James Milton DeVone, 3022 Chapel Hill Road, Apartment 70-C, Durham, N.C. 27703

[21] Appl. No.: 607,916

[22] Filed: Aug. 26, 1975

Related U.S. Application Data

[63] Continuation-in-part of Ser. No. 598,666, Nov. 23, 1973, abandoned.

[51] Int. Cl.² ................................................ B62J 17/00
[52] U.S. Cl. .................................... 296/78.1; 224/31; 280/289 R
[58] Field of Search ............. 296/78 R, 78.1; 224/31, 224/42.01, 30 R, 39 R, 5.1; 280/289

[56] References Cited

U.S. PATENT DOCUMENTS

| | | | |
|---|---|---|---|
| 1,135,337 | 4/1915 | Bunau-Varilla | 296/78.1 |
| 1,357,239 | 11/1920 | Krok | 224/30 R |
| 3,284,130 | 11/1966 | Michael | 296/78.1 |
| 3,547,325 | 12/1970 | Hill | 224/39 R |
| 3,709,553 | 1/1973 | Churchill | 296/78 R |
| 3,913,968 | 10/1975 | Luppens | 224/30 R |

FOREIGN PATENT DOCUMENTS

| | | | |
|---|---|---|---|
| 81,344 | 11/1919 | Germany | 296/78.1 |
| 460,783 | 12/1950 | Italy | 296/78.1 |
| 222,424 | 7/1942 | Switzerland | 296/78.1 |

Primary Examiner—Robert R. Song
Assistant Examiner—John A. Carroll
Attorney, Agent, or Firm—Mills & Coats

[57] ABSTRACT

In abstract, a preferred embodiment of the invention is a top for cycles which provides protection against the elements, enveloped by a multipurpose top cover. One feature of this invention is a transparent weather shield which is accessible for side and frontal protection against the elements and a suspended portion thereof which protects the rear of the rider. The adjustable top grouping of this invention can be detached and converted into a table, as well as a carrier for items of lightweight. The adjustable bottom grouping can serve as a support means for other attachments to the cycle, notwithstanding support means for said top.

2 Claims, 13 Drawing Figures

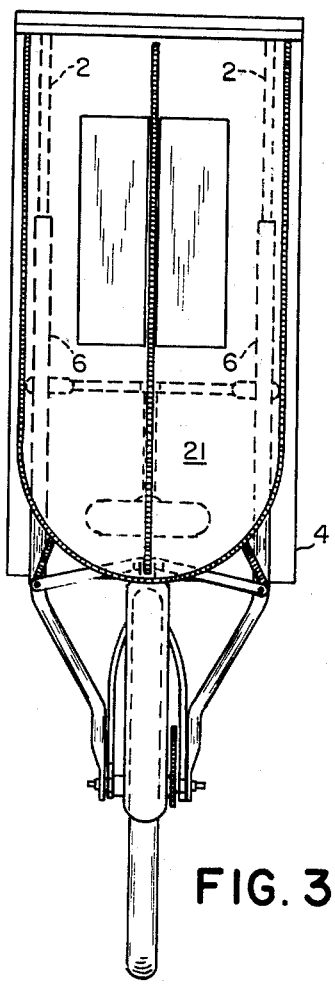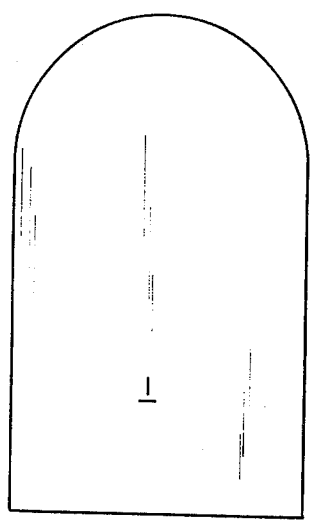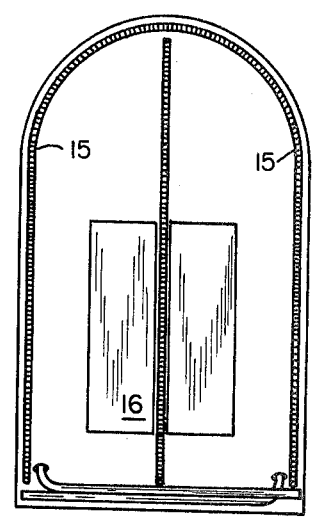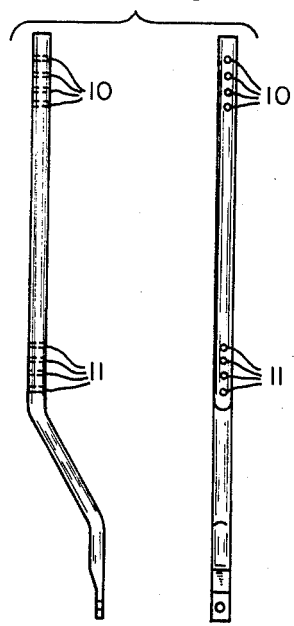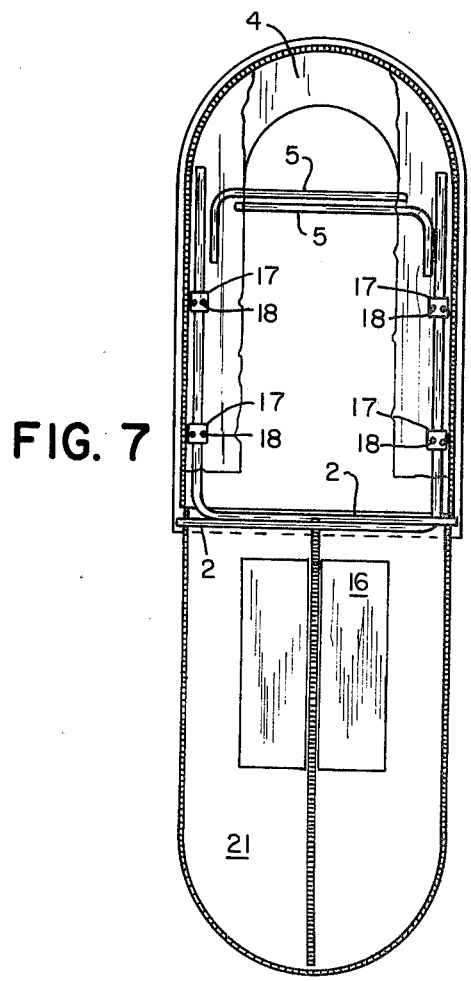

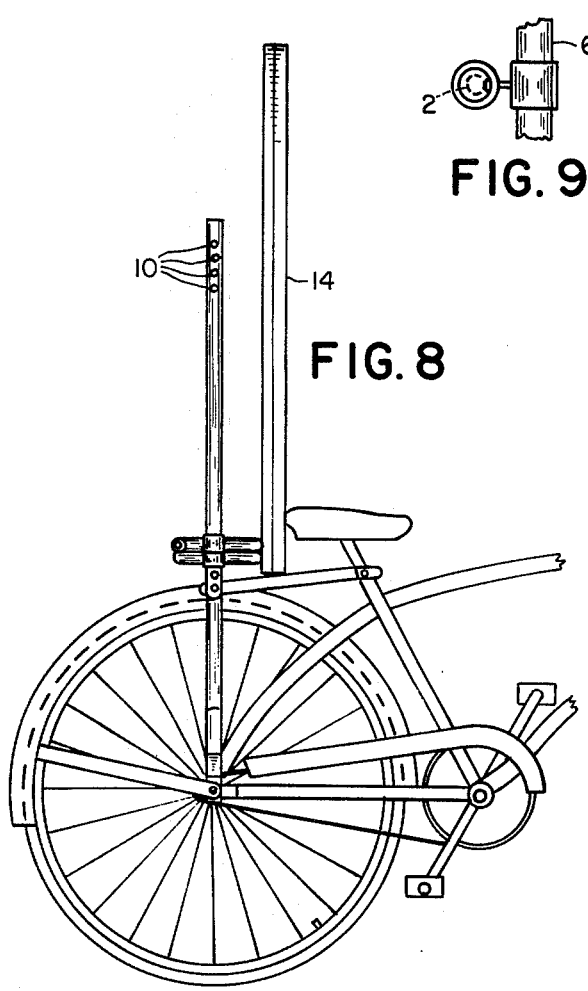
FIG. 8
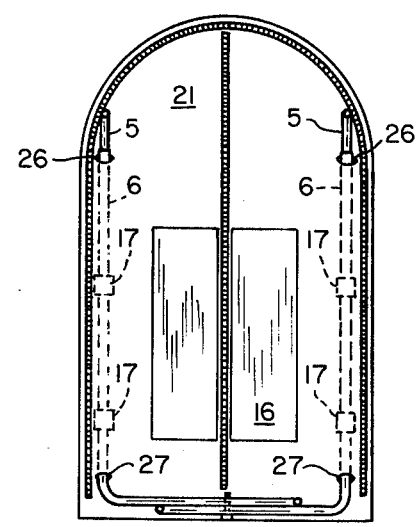
FIG. 9
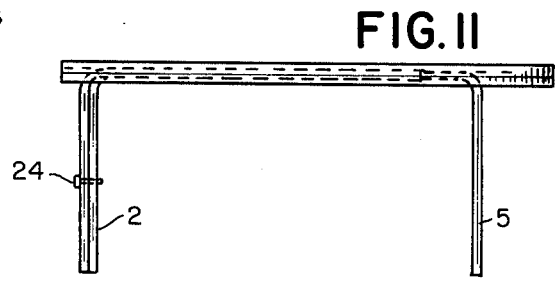
FIG. 10
FIG. 11
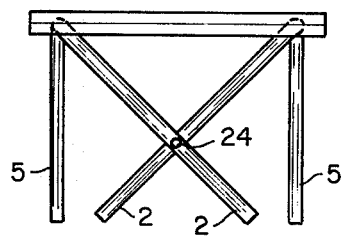
FIG. 12
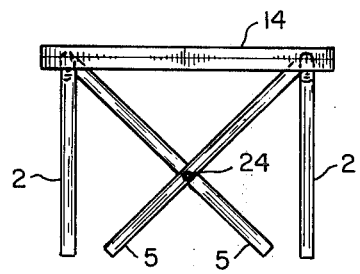
FIG. 13

CONVERTRA-BIKE TOP

This application is a continuation-in-part of Ser. No. 598,666, filed Nov. 23, 1973, and now abandoned.

BACKGROUND OF THE INVENTION

1. Field of the Invention

This invention relates to a convertible, detachable, adjustable portable top for cycles and, a detachable, adjustable support means, comprising a multipurpose top cover which protects the rider from the elements. As it will be made obvious in the description, hereinafter, this invention can be utilized for a number of other useful purposes.

2. Description of the Prior Art

A variety of "canopies" and other shade structures have been invented to provide cyclists with overhead protection against the elements and, some additional structures have been introduced which provide protection at the side, front, and/or rear of cyclists. However, there is an obvious need for a device which provides the functional ability to withstand the demands of faster traveling cycles, as even some bicycles have the ability to reach higher speeds in this era. There is also a need for a device which provides an array of functions for travelers, i.e., cyclists and motorists, to enhance their ability to transport more items and to accommodate their desire for a portable table and/or carrier.

SUMMARY OF THE INVENTION

A device for the class described of which the top portion can be detached and utilized for such purposes as: a picnic table, game table or the like; a backrest; and, a carrier for items of light weight. The bottom portion of this invention, which is attached to the vehicle can be utilized for such purposes as: a means for supporting the top member grouping; a means for attaching mounting brackets to the top member when used as a backrest; and, a means for attaching other devices desired by the rider. The multipurpose top cover can be removed from the top frame and used as a portable carrier for motorists.

The invention consists of the construction and combination of parts, as will be hereinafter set forth and claimed.

Referring to the drawings:

FIG. 3 is an illustration of the invention from the rear, which is in the aforementioned position for protection.

FIG. 4 is an illustration of the top frame.

FIG. 5 is an illustration of the top frame, enveloped by multipurpose top cover.

FIG. 6 is a rear and side view of the side supports.

FIG. 7 illustrates the position of the top members when the locking devices thereupon are diverged.

FIG. 8 is an illustration of the invention when the top members are used as a backrest and/or carrier.

FIG. 9 is a transverse and side illustration of the tubulous mounting brackets which secure the top members to the tubular, elongated side supports FIG. 10 illustrates the position of the top members when the locking devices located on the top cover are converged, with the shield guard members extended therefrom.

FIG. 11 is a side illustration of the top members when used as a table.

FIG. 12 is a rear illustration of the top members when used as a table, with top support members intersecting each other and, shield guards vertical.

FIG. 13 is a front illustration of the top members when used as a table, enveloped by top cover, with shield guard members intersecting each other and, top supports vertical.

Figure 1:
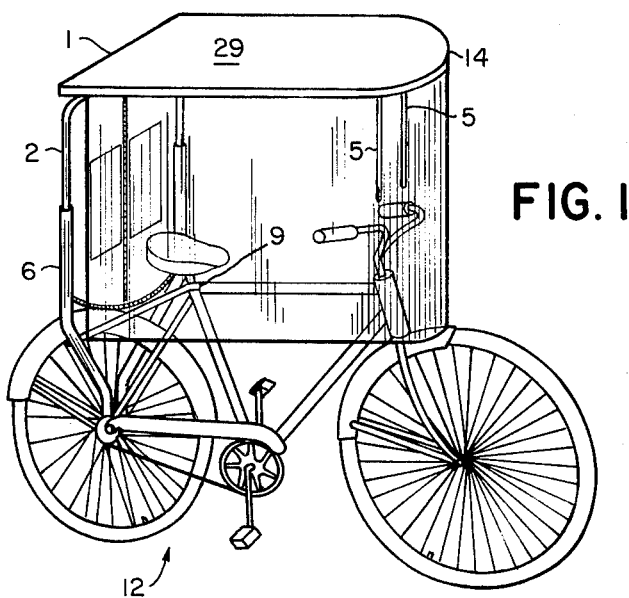
FIG. 1 is a perspective view of the invention, which demonstrates its use for overhead, frontal, side and rear protection against the elements.
Figure 2:
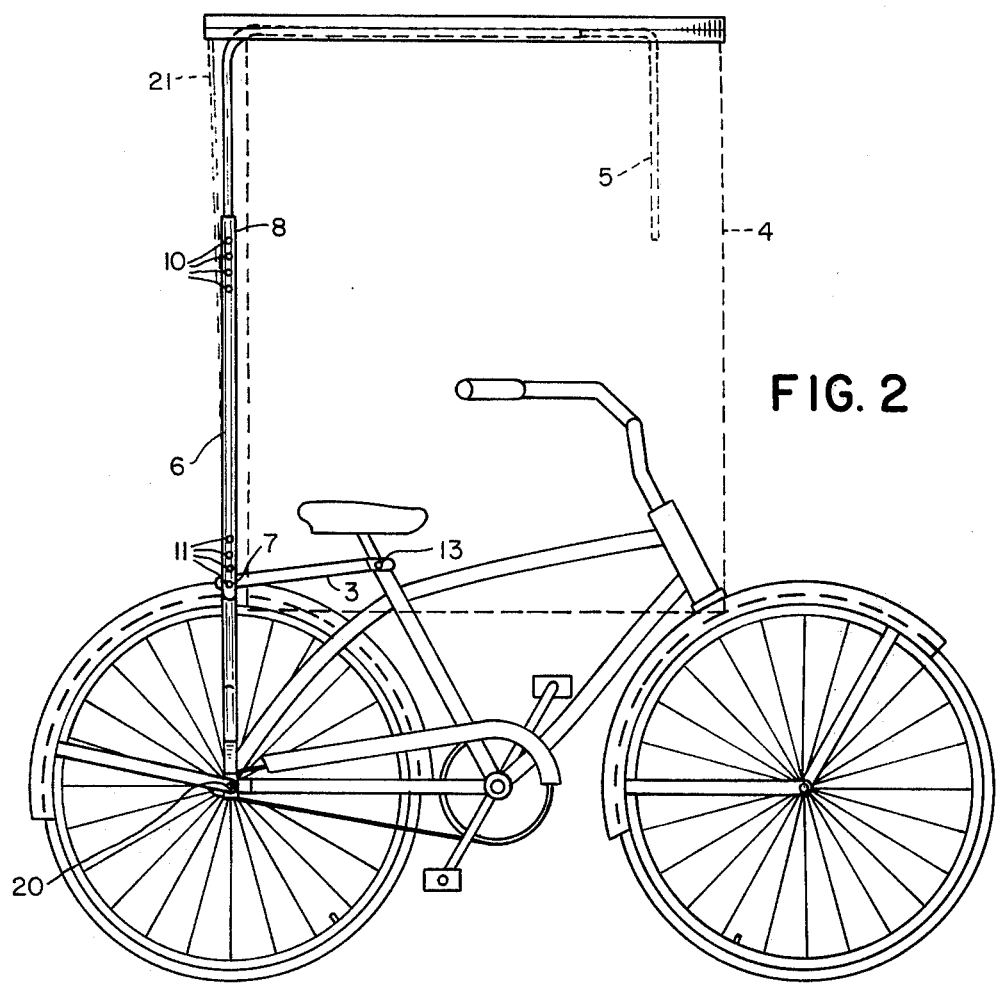
FIG. 2 illustrates a side view of the invention, which is in position for the above mentioned protection.

With continued reference to the drawings, the invention is mounted on the cycle 12 by removing the rear wheel axle nuts and attaching the holes 19 of the flattened portion of the tubular side supports 6 onto the rear wheel axles 20, and reattaching the nuts OR, by inserting bolts through washers larger than said holes on each side support through the holes 28 generally located on the cycle frame above the rear wheel axle which is generally used to attach "Sissy Bars" or the like thereto, and attaching nuts onto each bolt. The front extremities of the elongated side arms 3 are attached horizontally to the cycle seat mount bracket 9 by utilizing one of the respective holes 13 thereon which allows inward or outward adjustments for cycles of various dimensions. The rear extremities of the side arms are attached in a horizontal position by inserting bolts 7 thereupon into one of the vertically arranged holes 11 on the side supports. The top frame 1 for this invention is comprised of a pair of L-shaped tubular members constructed at an angle which permits vertical attachment to the side supports and horizontal support for the top frame. The horizontal portion 23 of the top support members are attached to the horizontally arranged top frame by means of a plurality of clamps 17 which are secured by bolts 18 thereon. The top grouping is attached to the side support members by inserting the generally smaller top support members 2 into the generally larger side support members 6. Bolts 8 are inserted into the corresponding vertically arranged holes 10 on the side supports and, into the corresponding top support holes 24. The top supports are secured by attaching nuts onto the bolts. The top frame, portions of the top supports, the plurality of clamps, a transparent weather shield and, a pair of shield guard members are enveloped by a top cover 14 and 21, which have locking devices 15 thereon. A portion of the top supports project through holes 27 in the top cover. Also, a portion of the shield guard (table leg) members 5 project through holes 26 in the top cover. All of the above mentioned top members form a convertible, detachable, adjustable, portable top 29.

In addition to the overhead protection afforded by this invention, frontal, side and rear protection can be acquired by diverging the plurality of locking devices 15 located on the top cover thereby, allowing the transparent weather shield 4 and one section of the top cover 21 freedom to suspend therefrom. There is a transparent, generally rectangular window 16 on the suspended section of the top cover which allows the rider freedom to view objects in the rear. The L-shaped shield guard members 5 are attached to the top frame horizontally and are rotated to a vertical down position thereby, preventing the transparent weather shield from the interferring with the rider. When attached to the top frame in a planar horizontal position (FIG. 7), the shield guard members are secured for storage purposes.

The top 29 can also be used as a table when detached from the side supports and the shield guards and top supports are rotated to form an X and/or rotated to a vertical down position and stablized. To secure the "table legs" in place, bolts are inserted into the vertically arranged holes 24 thereupon, attaching nuts, and/or forcing the vertical down members into soft ground. The top cover is then used as a table top cover (FIG. 13).

Although there is herein illustrated and described a preferred embodiment of the invention, it will be obvious to those skilled in the art that modifications and changes may be made without departing from the principles and spirit thereof. Accordingly, the appended claims hereinafter set forth are intended to embrace all such changes and/or modifications that fall within the scope thereof.

What is claimed is:

1. A multipurpose top for cycle type vehicles having a frame and a seat for a rider, comprising: a substantially rigid, elongated top frame, generally planar in construction and C-shaped at one extremity and straight at the other extremity; a pair of generally tubular, elongated, L-shaped combination shield guard and table leg members mounted generally parallel to the bottom surface of said top frame; clamp means securing said L-shaped guard members to said top frame; a plurality of detachable elongated generally divergent combination side supports and table legs vertically disposed between and attached to the vehicle frame on one end and said top frame on the other end; a plurality of detachable, elongated generally divergent tubular side arm members disposed generally horizontally and connected at one end to the vehicle seat mounting bracket and at the other end to, respectively, one of said side support members; and a combination top cover means and table top constructed of generally weatherproof material enveloping said top frame and comprising a plurality of sections including a combination weather shield and storage area at the rear of the seat of the vehicle, and a transparent weather shield extending about the sides and front of the vehicle whereby a multi-purpose top is provided which can be used as either a top or a removable table and, when in the cycle top configuration, provides a weather shield and storage area.

2. The top of claim 1 wherein a means is provided in said side support members for lengthening or shortening the same whereby riders of various heights may be accommodated.